(12) United States Patent
de los Santos Campos et al.

(10) Patent No.: US 8,301,003 B2
(45) Date of Patent: Oct. 30, 2012

(54) CABLE NETWORK INTERCONNECTION SYSTEM WITH CONNECTOR PACKAGE AND CABLE PACKAGE

(75) Inventors: Cesar A. de los Santos Campos, Reynosa (MX); Robert W. Dennis, Hickory, NC (US); Maximiliano G. Laborde, Hudson, NC (US); Jania A. Murillo, Tamaulipas (MX); Victoria A. Valderrabano, Tamaulipas (MX)

(73) Assignee: Corning Cable Systems LLC, Hickory, NC (US)

( * ) Notice: Subject to any disclaimer, the term of this patent is extended or adjusted under 35 U.S.C. 154(b) by 293 days.

(21) Appl. No.: 12/780,238

(22) Filed: May 14, 2010

(65) Prior Publication Data

US 2011/0280536 A1 Nov. 17, 2011

(51) Int. Cl.
*G02B 6/00* (2006.01)
*B23P 17/04* (2006.01)
*H05K 7/02* (2006.01)

(52) U.S. Cl. ............ 385/135; 385/53; 385/100; 29/428; 174/50; 174/541; 174/542

(58) Field of Classification Search ............ 385/53, 385/56, 58, 59, 60, 71, 75, 76, 77, 78, 100, 385/134, 135, 136, 137; 174/50, 52, 541, 174/542; 29/428
See application file for complete search history.

(56) References Cited

U.S. PATENT DOCUMENTS

| | | | |
|---|---|---|---|
| 6,058,235 A * | 5/2000 | Hiramatsu et al. | 385/135 |
| 7,346,253 B2 * | 3/2008 | Bloodworth et al. | 385/135 |
| 7,391,952 B1 | 6/2008 | Ugolini et al. | 385/135 |
| 7,554,828 B2 * | 6/2009 | Wilson | 363/146 |
| 2005/0117376 A1 * | 6/2005 | Wilson | 363/142 |
| 2006/0210230 A1 | 9/2006 | Kline et al. | 385/135 |
| 2008/0131067 A1 * | 6/2008 | Ugolini et al. | 385/135 |
| 2010/0329621 A1 * | 12/2010 | Makrides-Saravanos et al. | 385/135 |
| 2011/0280536 A1 * | 11/2011 | de los Santos Campos et al. | 385/135 |

FOREIGN PATENT DOCUMENTS

JP 9269422 10/1997

* cited by examiner

*Primary Examiner* — Brian Healy

(57) ABSTRACT

A fiber optic cable network interconnection system for installation in an interconnection apparatus. The system includes a connector package having at least one connector adapter and configured to support a portion of a connectorized cable. The system also includes at least one cable package that includes at least one length of cable and that is configured for storing a portion of the cable on substantially the exterior of the connector package. The cable package is sized to pass through the interconnection apparatus interior from the front opening to the rear opening as the connector package is inserted in the interconnection apparatus. Methods of installing the system in the interconnection apparatus are also disclosed.

30 Claims, 16 Drawing Sheets

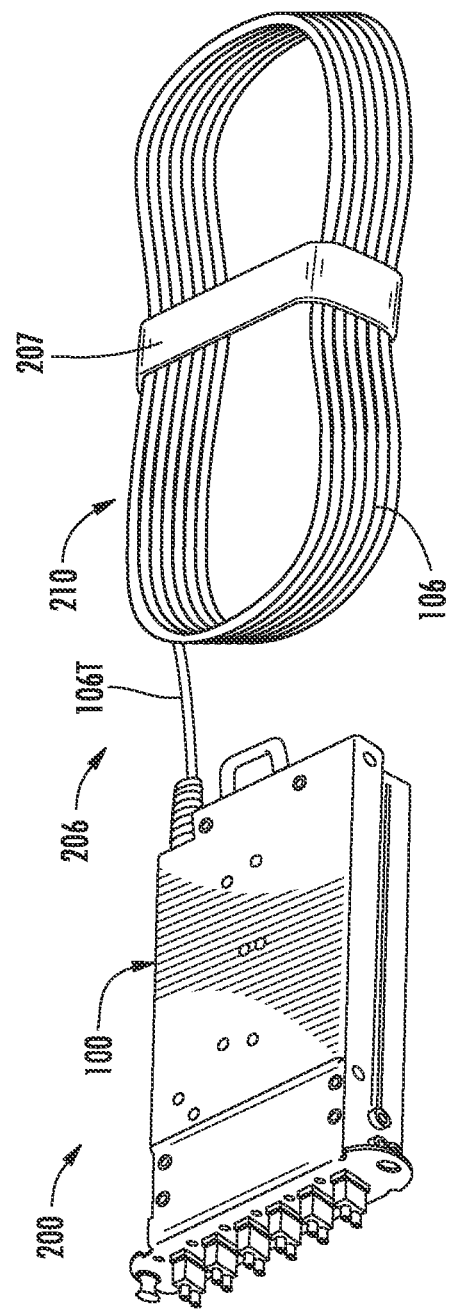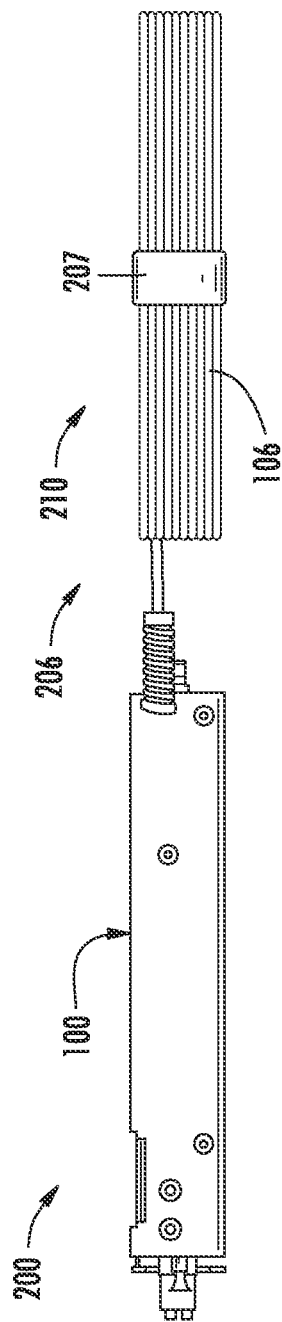

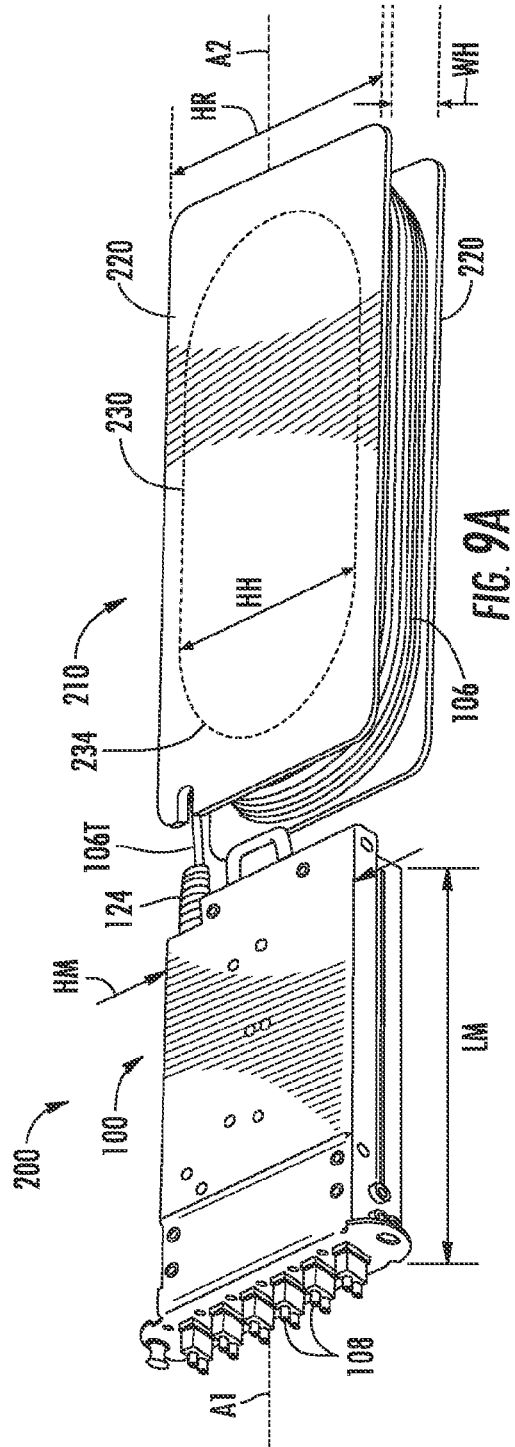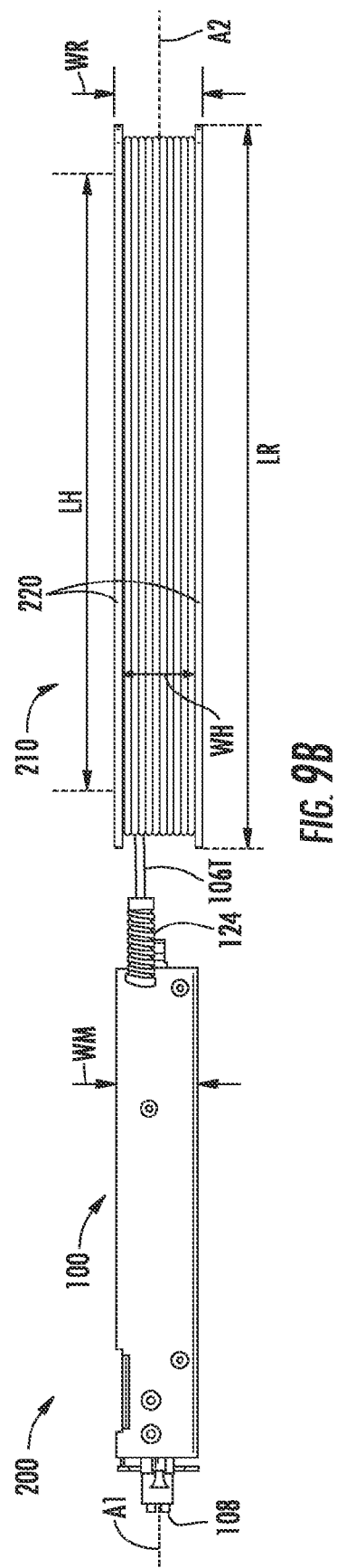

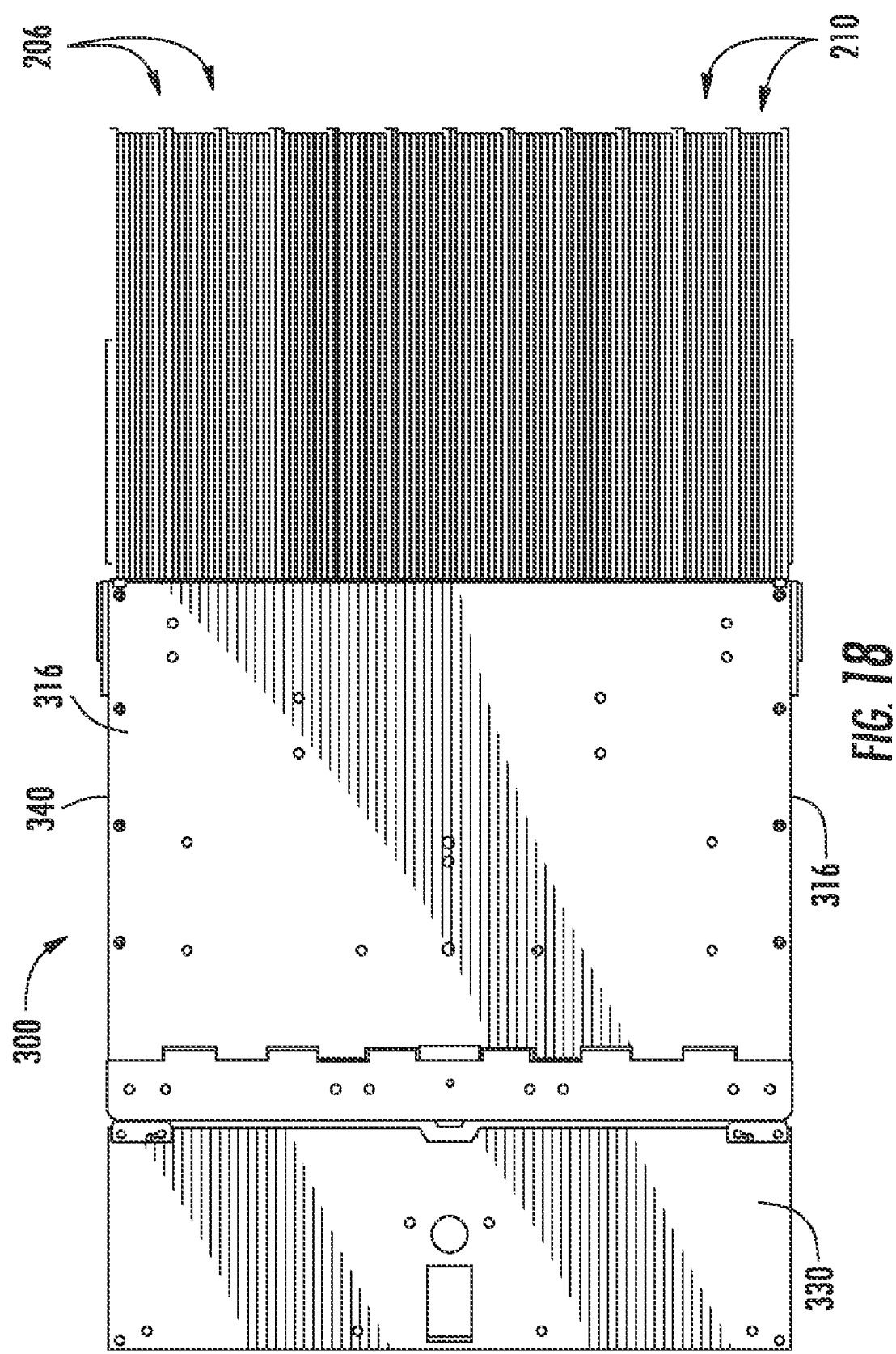

CABLE NETWORK INTERCONNECTION SYSTEM WITH CONNECTOR PACKAGE AND CABLE PACKAGE

FIELD

The present disclosure relates generally to storing and maintaining cable, for example, a fiber optic cable, and providing a link for future deployment within a data center or other network environment, and more specifically to a network interconnection system having a connector package and a cable package that, for example, allows a technician to coil and uncoil a desired length of cable from the rear side of an installed interconnection apparatus.

BACKGROUND

Networks are being developed to deliver voice, video, and data transmissions to subscribers over both private and public networks. These cable networks often include separated connection points at which it is necessary to link cables in order to provide transmissions from one connection point to another connection point. Often times, these separated connection points are found within different distribution frames within a data center or central office. Distribution frames are typically used to mount interconnection apparatus, terminal blocks and/or main frame connectors, and adapter access and cable management is often complex and difficult due to the number of connectors populating a distribution frame.

In order to facilitate module linking and interconnections, what is needed is a network system capable of being installed within conventional and hereafter devised connection terminals, such as interconnection apparatus, examples of which are found in the Pretium® Connector Housing family available from Corning Cable Systems LLC of Hickory, N.C. The system should be capable of linking separated connection points and provide protection and maintenance of the fiber optic cable. It would be desirable for the fiber optic cable within the system to be accessed from the rear side without having to uninstall the apparatus.

What is further desired is a complete package including a mountable housing that can store a length of cable, at least one adapter, securing features that do not require the use of tools, cable management features, and a cable including at least one, and preferably a plurality of, single connectors on one end of the cable routed to the at least one adapter and a connector on the other end of the cable for routing to a predetermined location within the network.

In addition, it would be desirable to have the ability to store large amounts of coiled cable and deploy the coiled cable once the system has been installed in the interconnection apparatus, while not having to change the size of the mountable housing.

SUMMARY

An aspect of the disclosure is a cable network interconnection device for installation in an interconnection apparatus interior, the interconnection apparatus having a front opening and a rear opening. The system includes a connector package having at least one connector adapter and configured to operably support a portion of a connectorized cable connected at a cable end to the at least one connector adapter, with another cable end connected to a connector. The system also has at least one cable package that includes at least one length of cable. The cable package is configured to store a portion of the cable on substantially the exterior of the connector package. The cable package is sized to pass through the interconnection apparatus interior from the front opening to the rear opening as the connector package is inserted in the interconnection apparatus.

Another aspect of the disclosure is a method of installing a cable in an interconnection apparatus. The method includes providing a connector package having at least one connector adapter. The connector package is configured to support a portion of a connectorized cable, with one cable end connected to the at least one connector adapter and another cable end connected to a connector. The method further includes providing at least one cable package having at least one length of cable and storing a portion of the cable on substantially the exterior of the connector package, with the cable package being sized to pass through the interconnection apparatus interior from the front opening to the rear opening as the connector package is inserted in the interconnection apparatus.

Another aspect of the invention is a pre-connectorized cable product for deployment in an optical interconnection apparatus having an interior with front and rear ends, the produce being formed by the process comprising providing a generally rectangular module having a housing and at least one connector adapter, the housing defining an interior cavity that contains a portion of a pre-connectorized cable, with an end of the cable portion connected to the at least one connector adapter and another cable end connected to a multi-fiber connector. The process also comprises providing a reel sized to pass through the optical interconnection apparatus interior from the front opening to the rear opening, and storing the cable portion on the reel in a coiled manner.

Additional features of the present disclosure are set out in the detailed description that follows, explaining the principles and operations thereof, and will also be readily apparent to those of ordinary skill in the art from the description and/or recognized by practicing the disclosure as described. It is to be understood that the general description above and the detailed description which follows present exemplary embodiments of the disclosure, which are intended to provide an overview and framework for understanding the nature and character of the disclosure as it is claimed. The accompanying drawings are incorporated into and constitute a part of this specification, illustrating and further highlighting the exemplary embodiments of the present disclosure.

These and other aspects of the disclosure will be further understood and appreciated by those skilled in the art by reference to the following written specification, claims and appended drawings.

BRIEF DESCRIPTION OF THE DRAWINGS

A more complete understanding of the present disclosure may be had by reference to the following detailed description when taken in conjunction with the accompanying drawings, wherein:

FIG. 8A is a perspective view and FIG. 8B is a side view of an example cable network interconnection system ("ITM system") that includes an ITM connector package and a cable package.

FIG. 9A is a perspective view similar to FIG. 8A, and FIG. 9B is a side view similar to FIG. 8B, where the cable package includes a cable support in the form of a reel.

FIG. 17 and FIG. 18 are perspective and top-down views, respectively, of the interconnection apparatus of FIG. 14 and FIG. 15, shown with multiple ITM systems installed therein.

DETAILED DESCRIPTION

Reference is now made in detail to the embodiments of the present disclosure, examples of which are illustrated in the accompanying drawings. Whenever possible, like reference numbers will be used to refer to like components or parts.

Although specific data center network apparatus are shown in the form of ITMs and include duplex SC or LC connector adapters, it is envisioned that other apparatus configurations including any connector package, adapter, connector or cable type, may be incorporated without departing from the spirit and scope of the present disclosure. Although the present disclosure is primarily described for use in a data center, the present disclosure may be deployed in any network environment in which is it desired to provide a link or interconnection. The apparatus may be a stand-alone unit or may be mounted within interconnection apparatus (e.g., a connector housing), a distribution frame, or other mounting structure.

U.S. Pat. No. 7,391,952 is incorporated by reference herein.

Figure 1:
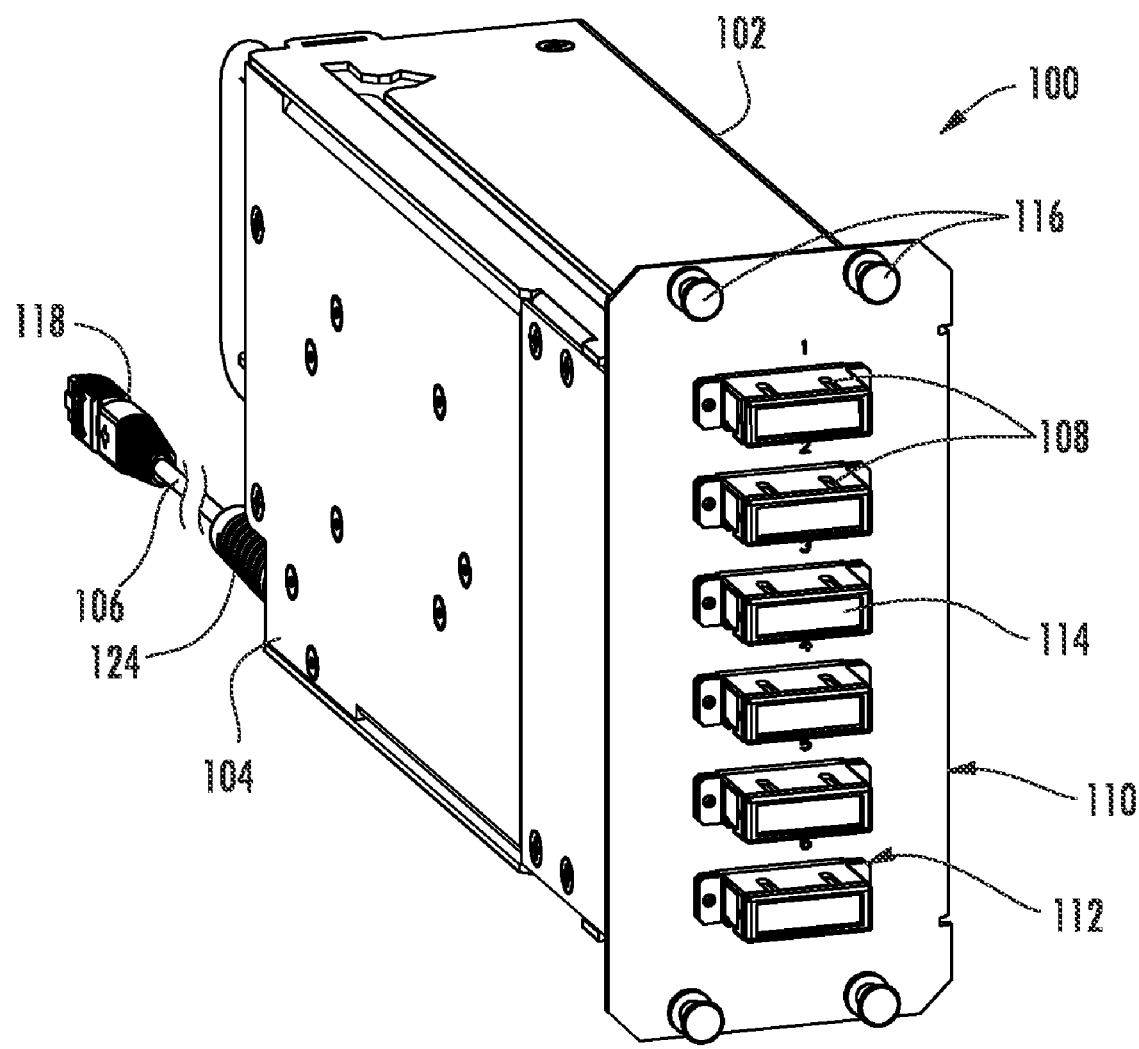
FIG. 1 is a front perspective view of a prior art pre-connectorized data center network apparatus as a connector package in the form of an integrated trunk module (ITM) having multiple connector adapters.

Referring to FIGS. 1-8, there is shown an apparatus in the form of an integrated trunk module (ITM) connector package 100 (hereinafter, ITM 100). ITM 100 includes a housing 102, a cable storage tray 104 slidably and pivotally attached to the housing 102, a length of cable ("cable") 106, which can be copper or optical fiber cable, and at least one connector adapter 108 (multiple connector adapters are shown by way of illustration). Factory pre-connector system or field connectors can be used in any aspect of the present disclosure. Referring specifically to FIG. 1, a front end 110 of the ITM 100 defines one or more slots 112 arranged in any number of rows or columns operable for receiving and securing the at least one adapter 108 within. As shown, the ITM 100 includes a single row of slots 112 with each slot receiving a single SC duplex adapter 108 for a total of six adapters 108 providing connection points for twelve SC connectors. As stated above, the ITM 100 may include any number of connector adapter or connector receiving sites capable of accommodating any type and number of connectors. As shown, the adapters 108 include removable covers 114 for protecting unpopulated adapters until needed. The front end 110 further includes attachment features 116 for removably securing the ITM 100 to or within a distribution frame, interconnection apparatus or other mounting structure. As shown, the attachment features 116 include a plunger and grommet configuration that allows for the ITM 100 to be installed or removed without the use of tools. The housing 102 and cable storage tray 104 together define a cable storage cavity 105 for storing a length of pre-connectorized cable 106 that may be manually coiled or un-coiled as needed and routed to a predetermined location within the network.

It is noted here that ITM 100 is discussed herein as but one an example of a more general connector package, which generally can compromise fewer components than the modular embodiment of ITM 100, while being configured to store or otherwise support a length of pre-connectorized cable 106. For example, the connector package 100 can include a shelf (e.g., storage tray 104), a drawer, or just an adapter panel (e.g., just ITM front end 110), all without having housing 102. The discussion herein emphasizes the connector package in the form of an ITM by way of non-limiting example.

Still referring to FIG. 1, the cable 106 is shown terminating at one end in a multi-fiber connector 118. Although an MTP connector is shown, it is envisioned that the cable 106 may terminate in any type of single fiber or multi-fiber connector, but preferably terminates in a multi-fiber connector. Although not shown, the other end of the cable terminates in at least one connector, and preferably a plurality of single fiber connectors such as SC or LC connectors. The cable 106 is routed within the ITM 100 through a transition lid (described in detail below) where the at least one, and preferably a plurality of, connectors are routed to the backside of the at least one adapter 108. Thus, ITM 100 is capable of receiving at least one connector from the inside of the ITM 100 from the cable 106, and at least one connector from another source from the outside of the ITM. The mating connectors may be of like configuration or may be different. Thus, the at least one adapter 108 may be a standard adapter or a hybrid adapter. Although not shown, each at least one adapter 108 may include a connector alignment sleeve. The cable 106 has a predetermined length and is stored within ITM and is coiled and uncoiled in order to provide an adequate length for routing the multi-fiber connector 118 to the predetermined location.

Figure 2:
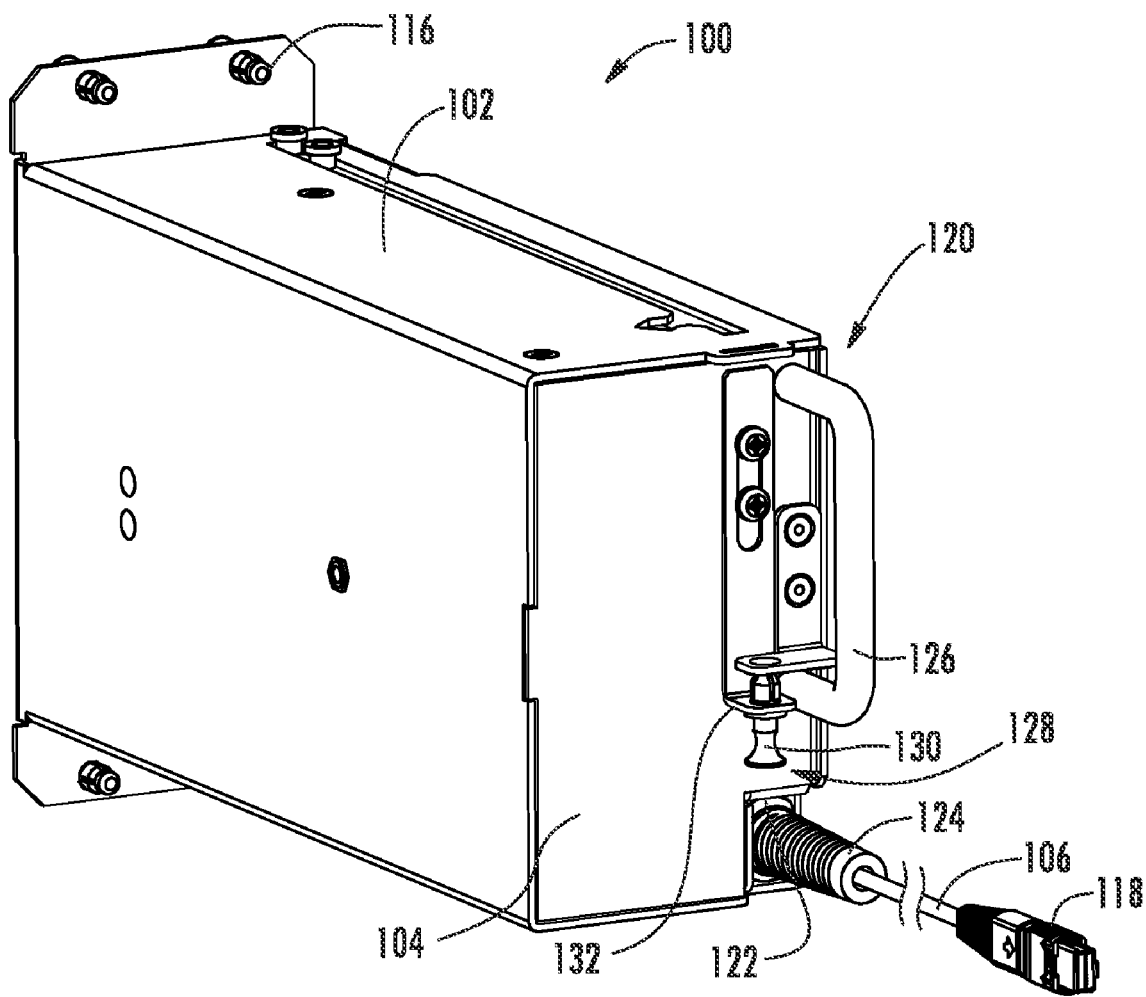
FIG. 2 is a rear perspective view of the prior art ITM of FIG. 1, illustrating a pre-connectorized fiber optic cable, cable exit point, pull handle and locking mechanism.

FIG. 2 shows a rear perspective view of ITM 100. The rear side 120 of the ITM 100, and specifically the storage tray 104, includes a pre-connectorized cable exit point 122, a transition boot 124 positioned within the exit point 122 for transitioning the cable from within to outside of the ITM 100, a pull handle 126 for pulling out and pushing in the storage tray 104 as needed, and a tray locking mechanism 128. The handle 126 may be replaced with any feature capable of being grasped to operate the storage tray 104. The locking mechanism 128 is operable for preventing the storage tray 104 from being unintentionally opened when a strong pull on the cable 106 occurs. The lock mechanism 128 shown includes a plunger 130 and bracket 132. In order to disengage the storage tray 104 from the housing 102, the plunger 130 is pulled up and the bracket 132 lifted, and the tray 104 is then opened. To lock the tray 104 in place, the tray 104 is closed, the bracket 132 is pushed down against a bracket receiving tab, and the plunger 130 is pushed down to secure the bracket 132 against the tab of the housing 102.

Figure 3:
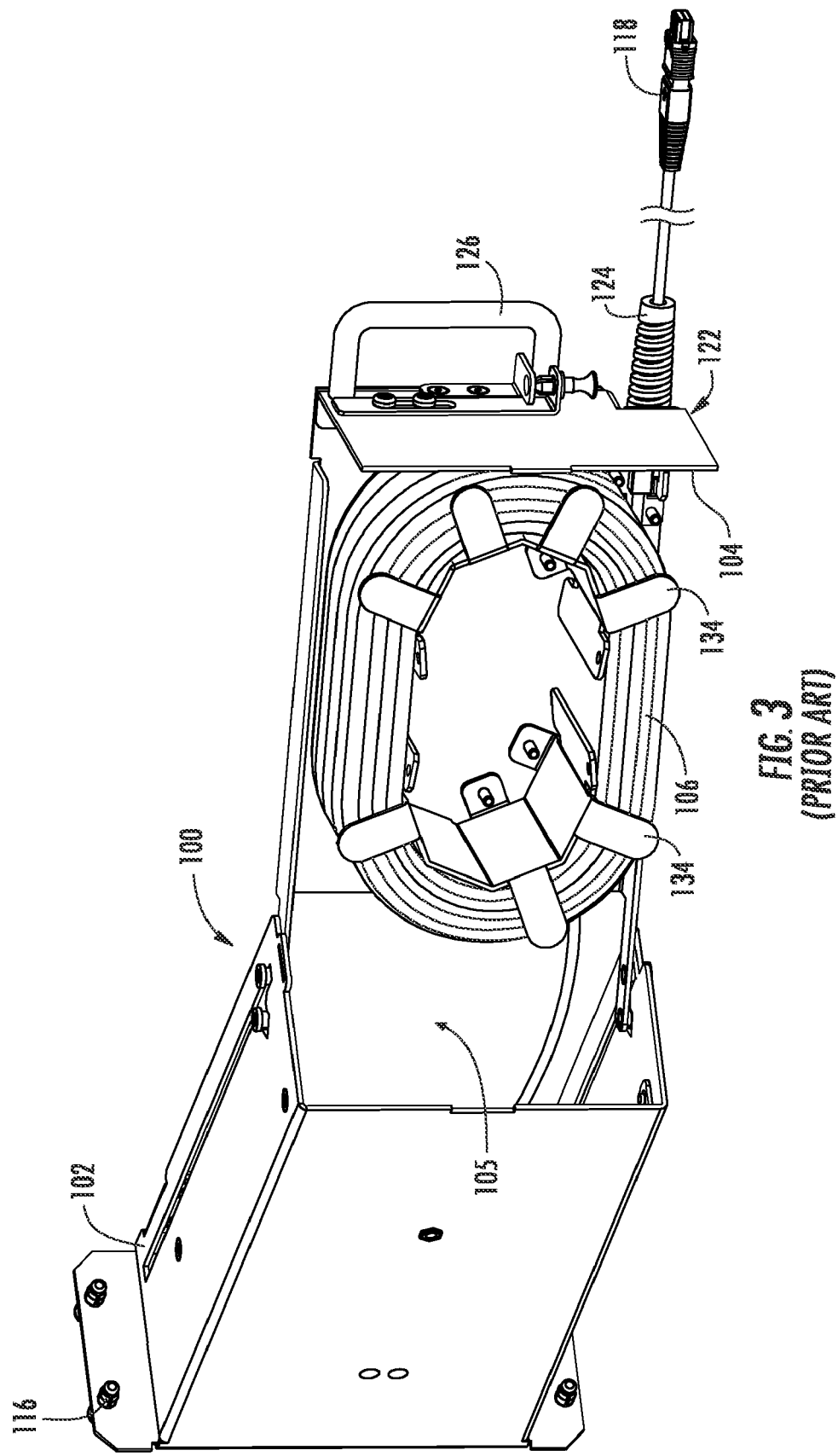
FIG. 3 is a rear perspective view of the prior art ITM of FIG. 1 shown with the storage tray in an opened and pivoted position.

Referring to FIG. 3, the storage tray 104 is shown in an opened and pivoted configuration. The storage tray 104 includes at least one cable maintaining and retaining feature 134. The at least one feature 134 is operable for maintaining the cable 106 in a coiled configuration without violating the minimum band radius of the fiber. The length of coiled cable may be of any length. ITM 100 width may be determined by the amount of slack contained within. The cable length is wound around the at least one feature 134 during shipping and deployment and uncoiled as needed. The cable length may range from about 1 foot to several hundred feet in length, preferably from about 1 foot to about 100 feet in length. The cable 106 may be coiled in either direction and is preferably coiled so that each end of the cable is smoothly routed to its respective predetermined destinations within the ITM 100 without introducing sharp bends in the cable. The cable 106 may further be coiled with a length of slack free from the coil to allow the storage tray 104 to be extended without pulling on the cable.

In operation, and as described in more detail below, the cable 106 exits the ITM 100 through the exit point 122. The cable 106 is fed through the cable transition boot 124. The transition boot 124 is retained within the exit point 122. The flexible transition boot 124 prevents kinking or sharp bending in the cable adjacent the storage tray 104. As a length of cable 106 is uncoiled, the cable is pulled and slides through the transition boot 124. In an alternative embodiment, the transition boot 124 may provide partial strain relief to the cable 106 when the boot 124 is inserted into the exit point 122 and the exit point recess compresses the boot 124. In one embodiment, the transition boot 124 may include ridges on the interior surface such that when the boot is squeezed when slid into the storage tray slot, strain relief and partial or total sealing may occur. The ITM 100 may be designed to be either left- or right-opened, and the exiting cable 106 may be located at either the top of the bottom of the ITM.

Figure 4:
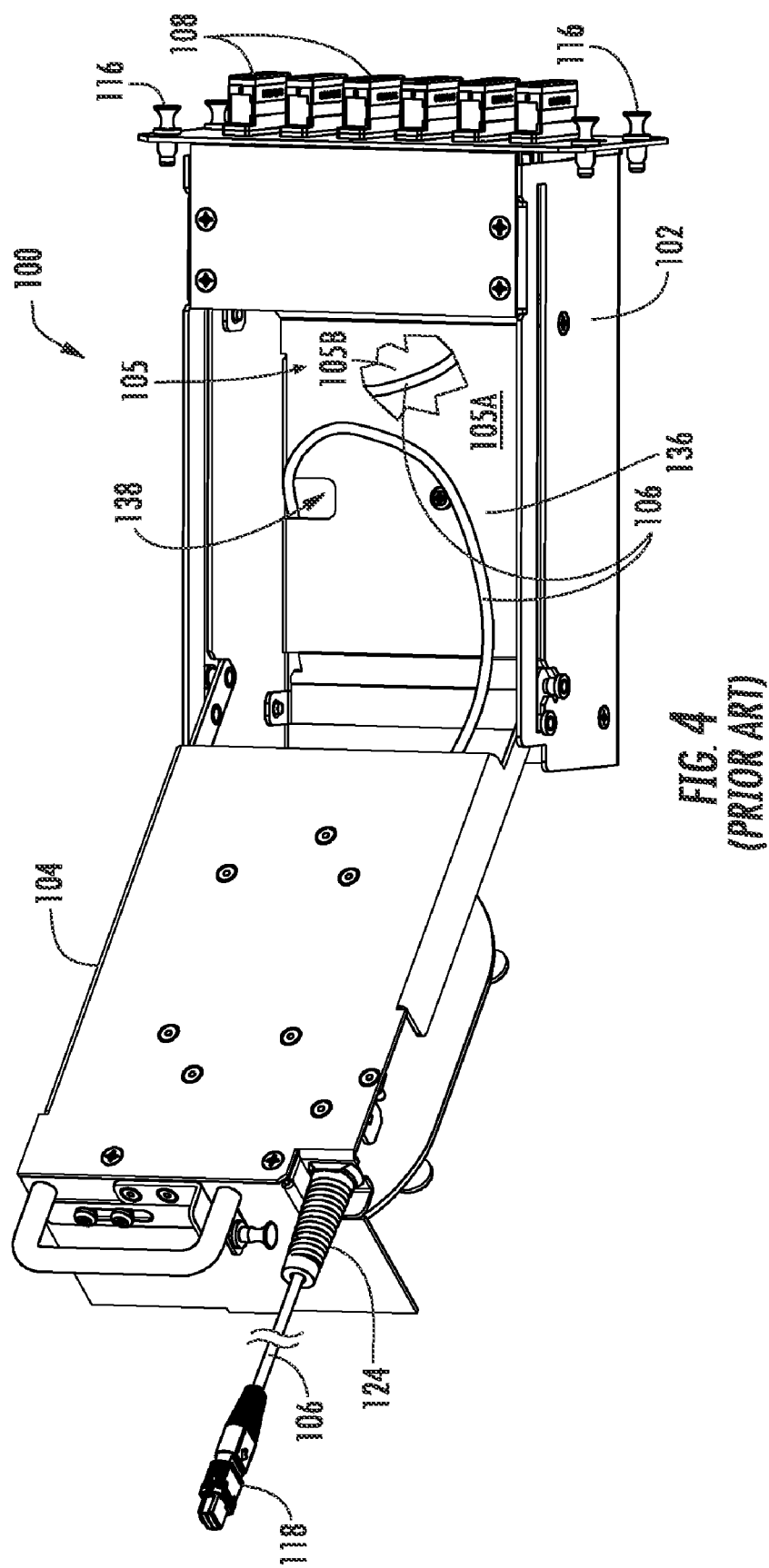
FIG. 4 is a perspective view of the prior art ITM of FIG. 3, shown with the storage tray in an opened and pivoted position and illustrating the transition lid.

Referring to FIG. 4, the storage tray 104 is shown in an opened and pivoted configuration in order to illustrate the internal cavity 105 of the ITM 100 and the transition lid 136. Internal cavity 105 includes a first internal cavity portion 105A for cable storage and a second cavity portion 105B for cable routing to the at least one adapter. The first and second cavity portions are separated by the transition lid 136, also referred to herein as the "false bottom." The transition lid 136 may define an opening 138 for transitioning the cable 106 from the first cavity portion 105A to the second cavity portion 105B. The transition lid 136 may further provide protection to the pigtailed end of the cable 106 when the ITM 100 is accessed to coil or uncoil the cable 106. In the example shown, the transition lid 136 hides/covers the routing of the 12 fibers to their respective adapters 108. In an alternative embodiment, a single fiber connector may be mounted in place of the multi-fiber connector, and a splitter or other signal splitting device may be mounted within the ITM, for example within the second cavity portion 105B, thus allowing multiple fibers to be routed to the adapters.

Figure 5:
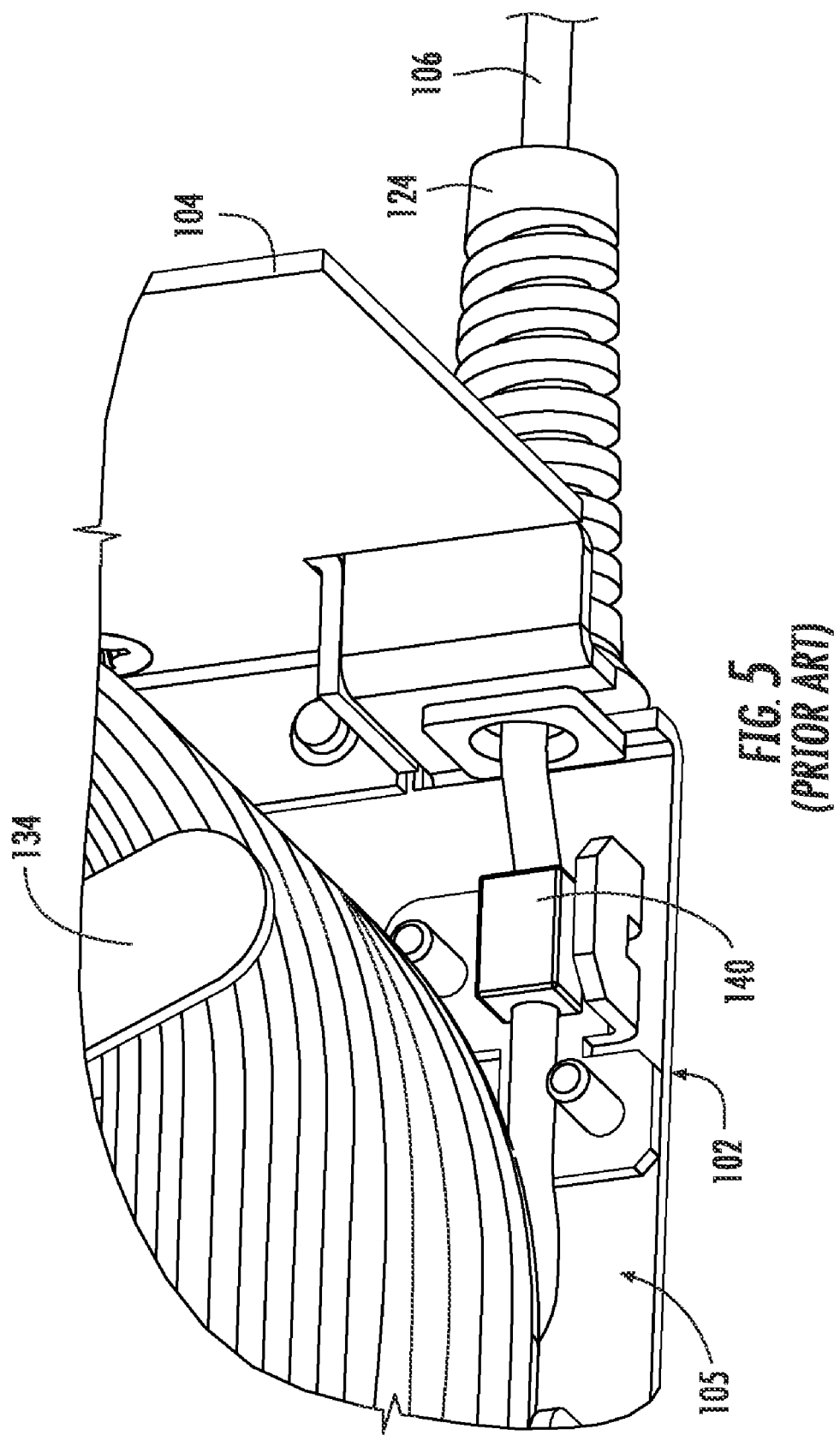
FIG. 5 is a detailed perspective view of the prior art ITM of FIG. 1, illustrating the strain relief feature and flexible boot for fiber optic cable exiting the ITM housing.

Referring to FIG. 5, the cable strain relief and transition boot 124 are shown in detail. Once uncoiled to a desired length, the cable 106 may be strain relieved to the storage tray 104 to relieve the internal remaining length of cable from pulling forces applied to the external portion of the cable. The cable may be partially strain relieved using the transition boot 124 as described above. The cable may also be strain relieved using a grommet 140 that is secured to a surface of the tray 104, preferably an interior surface. The cable may also be strain relieved using any other method known in the art including, but not limited to, cable ties.

Figure 6:
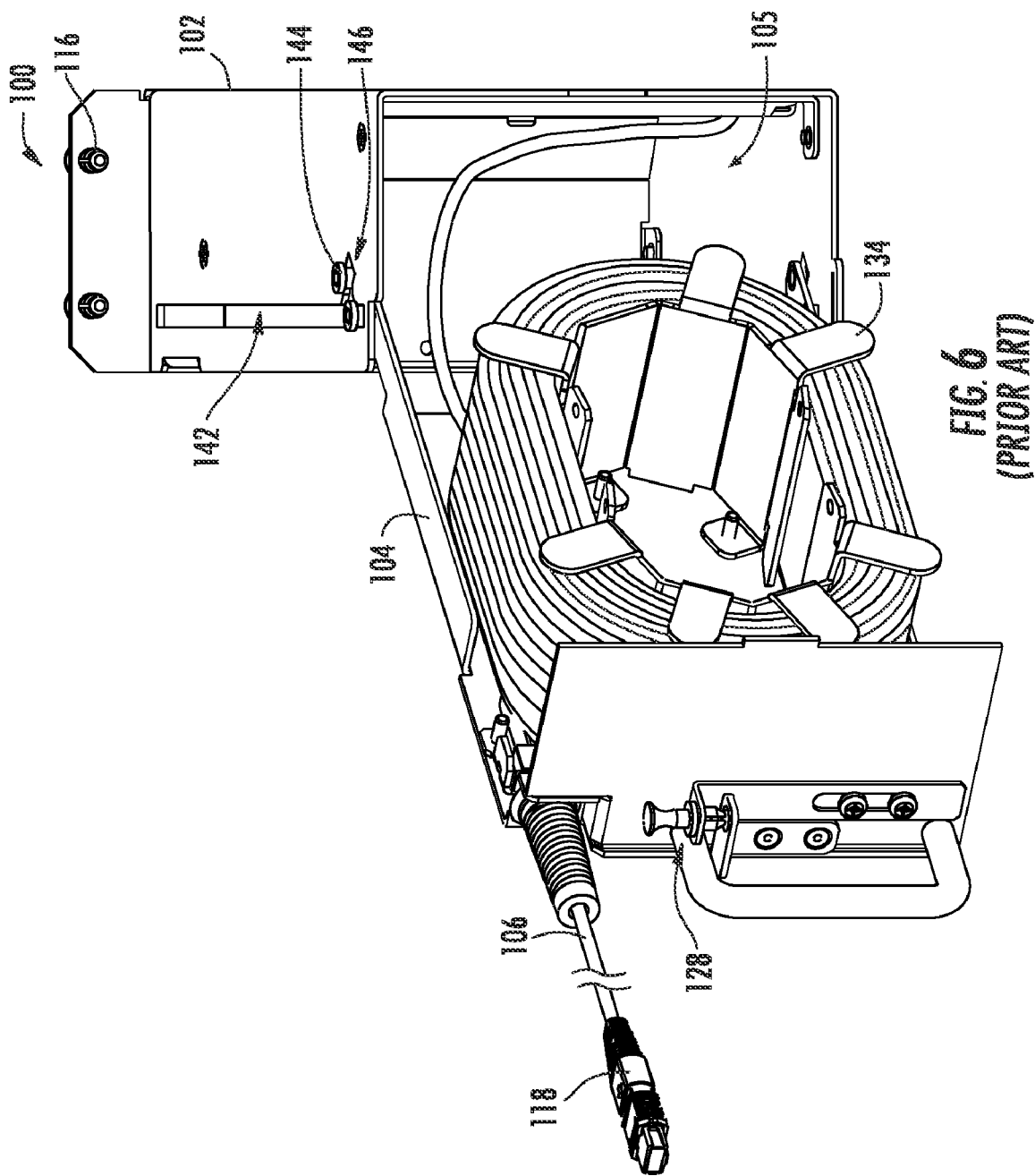
FIG. 6 is a perspective view of the prior art ITM of FIG. 1, shown with the storage tray in an opened and pivoted position.

Referring to FIG. 6, the ITM 100 is shown with the storage tray 104 both slid open and pivoted and the locking mechanism 128 released. The housing 102 includes channels or slots 142 positioned along the length of each side of the housing that provide a track for guiding and maintaining rollers 144 or wheels of the storage tray 104. The sliding and pivoting movements of the storage tray 104 are supported by the rollers 144. In addition, by providing two rollers 144 on each side of the storage tray 104, the tray is prevented from twisting before the end of the movement. At the fully extended position, at least one of the rollers 144 of each side of the storage tray 104 may extend into a pivot allowing slot 146 routed at a predetermined angle off of the tracks 142. By allowing the storage tray 104 to pivot at full extension at the end of the sliding movement, the field technician is provided with improved access to the cable length once the ITM 100 has been installed in the field. The ability to pivot aids the technician in coiling and uncoiling the cable length, particularly in applications in which multiple ITMs are mounted in parallel within a single interconnection apparatus. The storage tray 104 may pivot up to about 90 degrees relative to the longitudinal axis of the ITM, more preferably up to about 45 degrees. A predetermined maximum pivot may be provided to prevent the storage tray 104 from contacting an adjacent ITM. As shown, the storage tray 104 is rotated about 40 degrees relative to the longitudinal axis of the ITM.

Figure 7:
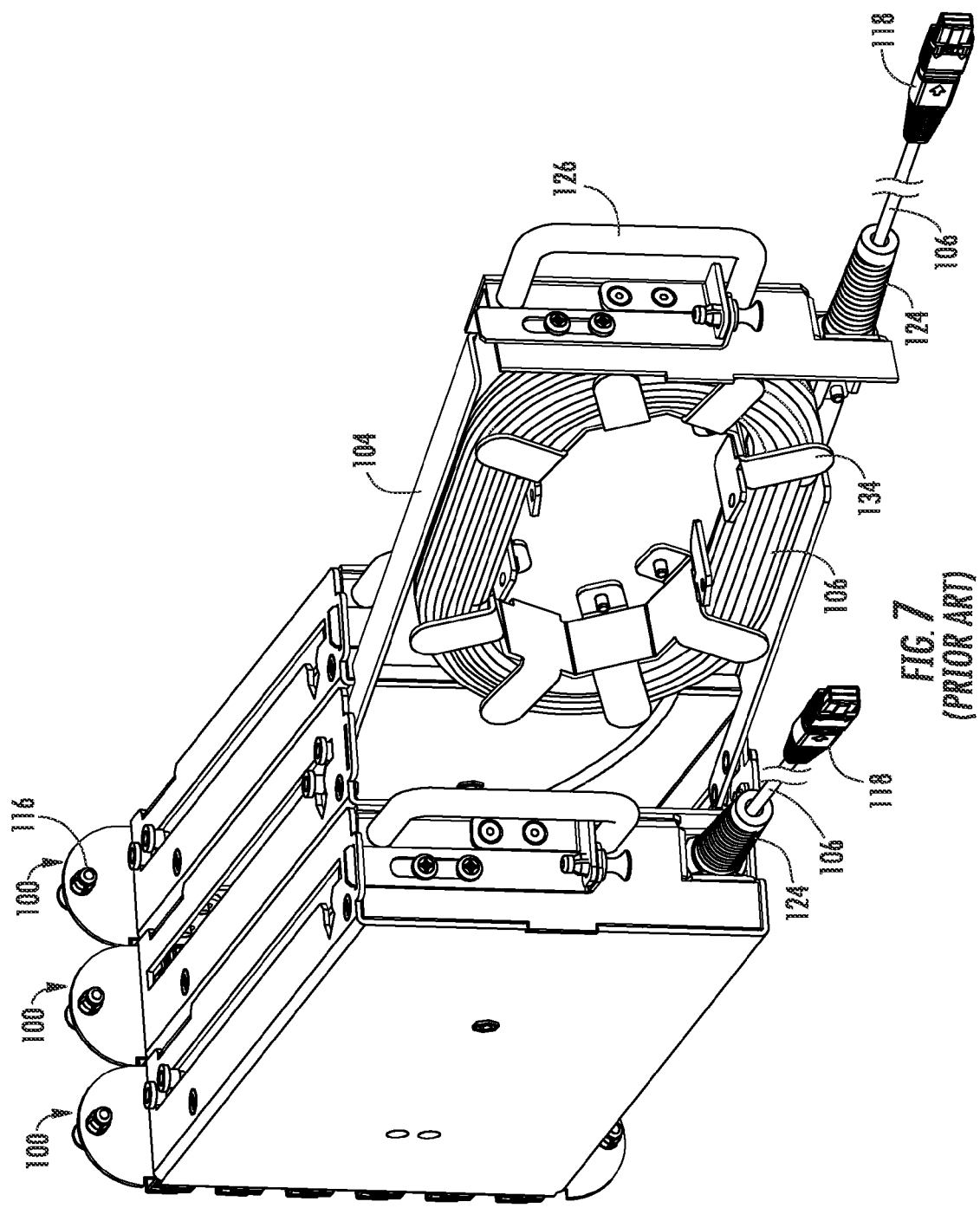
FIG. 7 is a perspective view of multiple prior art ITMs arranged in parallel, with one of the storage trays in the open and pivoted position.

Referring to FIG. 7, multiple ITMs 100 are shown as arranged in parallel, illustrating a typical installation environment in a interconnection apparatus (not shown in FIG. 7). Example interconnection apparatus in which the ITMs 100 may be installed include the Pretium™ Connector Housing family available from Corning Cable Systems of Hickory, N.C. A specific installation environment may include installation within a data center into a PCH-04U connector housing, available from Corning Cable Systems. As shown, the storage tray 104 of the middle positioned ITM 100 is shown in the fully extended position and is also pivoted, thus providing ready access to the cable length.

In the various embodiments described above, the housing, storage tray and other components may be made from various materials such as, but not limited to, plastics, metals, combinations and the like depending upon installation environments. The transition boot is preferably made from a flexible material. The ITM dimensions may vary depending upon the amount of cable storage required and the number of adapters. Some embodiments do not require tools for the operation of mounting the ITM, accessing the storage tray, or coiling and uncoiling the cable length. The ITMs described above provide rear side access to the cable length and do not require the ITM to be removed from its mounting position to access the cable length. Alternative ITM designs may include sliding-only storage trays or pivoting-only storage trays.

The pre-connectorized cable 106 may include any type of optical fiber including, but not limited to, bend performance optical fiber, also referred to as bend insensitive optical fiber or bend optimized optical fiber. Bend performance fiber includes microstructured optical fibers comprising a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than 1400 nm, in other embodiments also greater than 1260 nm. The optical fibers provide a mode field at a wavelength of 1310 nm preferably greater than 8.0 microns, more preferably between 8.0 and 10.0 microns. In embodiments, the bend performance fiber is thus single-mode transmission optical fiber.

The connector package has dimensions determined by the size of the apparatus (e.g., interconnection apparatus) in which the connector package is to be installed. This defines the allowable size of the connector package and sets limit on the amount of cable 106 that can be stored within the connector package. For example, two different example ITMs of conventional size have respective internal cavities 105 that can respectively store 40 feet and 80 feet of cable 106. However, in many cases it would be desirable to have greater lengths of cable 106 available (for example, 200 feet) without modifying the size of ITM 100.

FIG. 8A is a perspective view and FIG. 8B is a side view of an example pre-connectorized cable network interconnection system or ITM system 200 that includes a connector package in the form of the example ITM 100 discussed above, and also includes a cable package 206. The ITM 100 and cable package 206 set out in the embodiments of the present disclosure can include a cable support 210, as discussed below. The cable support 210 can comprise a reel, as set out in detail herein, or alternatively comprise one or more generally flat supports, or a conical reel, cylinder, core, pay off, drum, tube, spool, one or more rods or beams, or a cable accumulator. The cable support 210 can be rectangular as set out in detail herein, or alternative shapes can be used for example, square, round, oval, or any other suitable shape. In embodiments such as shown in FIGS. 8A and 8B, where no cable support 210 is used, one or more straps 207 can be used to hold cable 106 in a given collected (coiled, wrapped, bundled, or rolled) configuration.

The cable 106 disposed on the cable support 210 can be arranged in exemplary configurations including coiled as set out in detail herein, or it could be arranged in a spiral, undulated, serpentine, or arcuate bundles, rolled, wrapped, or wound on the cable support. More than one cable support 210 can be attached in series in a concatenated configuration. The cable package 206 can be configured with no cable support, and in this case could be a spiral, undulated, serpentine, or bundles of cable or a coil, roll, wrapping, or winding of cable. More than one cable 106 can be included in the cable package. The cable 106 can include one or more optical fibers, can include one or more copper conductors, or can include one or more hybrid optical fiber-copper cables. If more than one cable is used, the cable length can be the same or different. ITM system 200 can be used in interconnection applications beyond data centers, for example, central office applications, and installations in the outside plant structures.

FIG. 9A is a perspective view similar to FIG. 8A and FIG. 9B is a side view similar to FIG. 8B and illustrate an example ITM system 200 with the cable package 206, which includes an example cable support 210 in the form of a reel. ITM 100 is shown as having a longitudinal axis A1 and the cable support 210 is shown as having a longitudinal axis A2. A first portion of the cable 106 of length LC1 can be stored within the ITM internal cavity 105 as described above, while a second portion of the cable of length LC2 can be stored on the cable support 210. In an example, LC1<LC2. FIG. 9A and FIG. 9B show the ITM system 200 in an in-line configuration wherein ITM 100 and cable support 210 are arranged so that they are lined up generally along their respective longitudinal axes A1 and A2.

Figure 10:
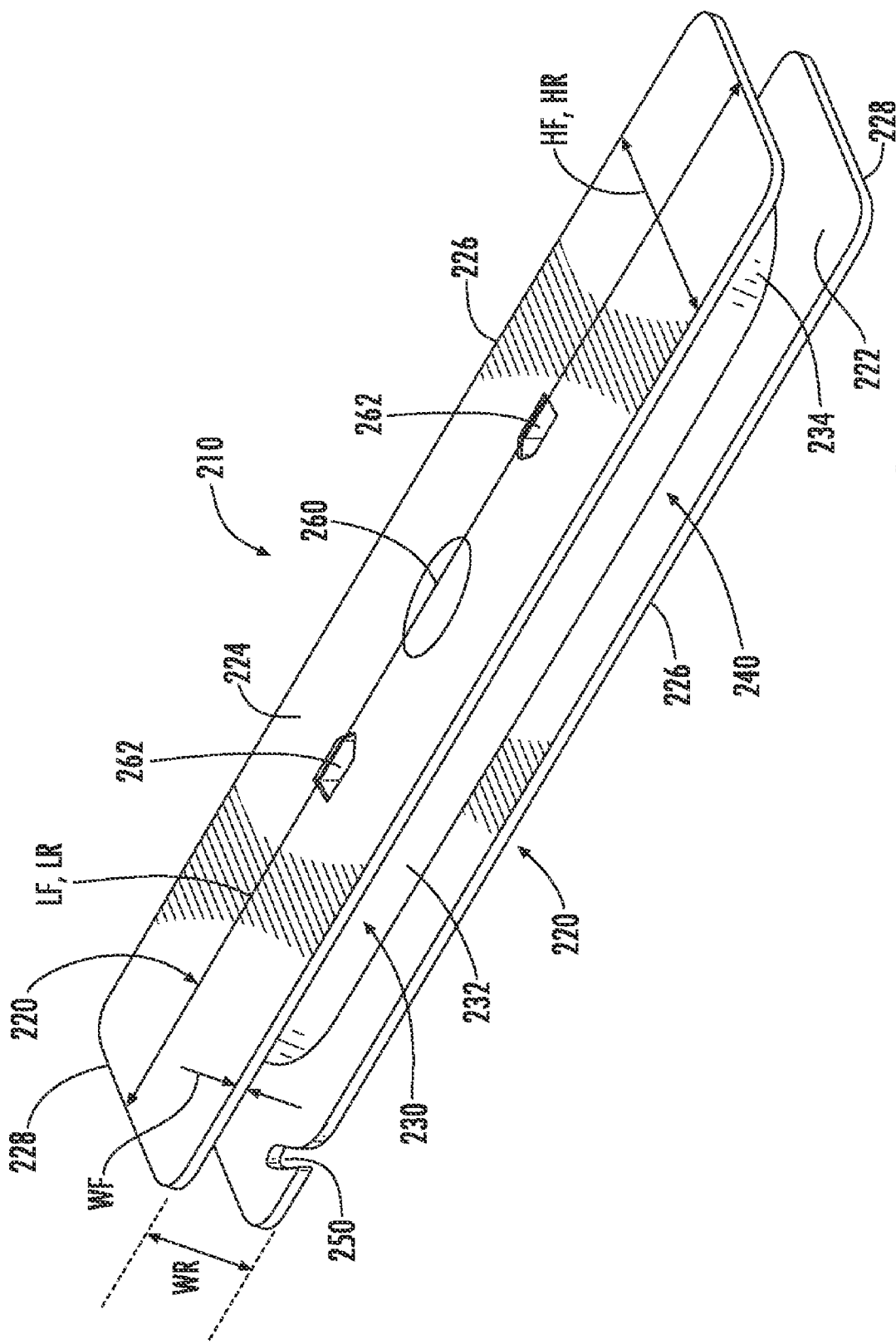
FIG. 10 is a close-up perspective view of an example reel cable support.

FIG. 10 is a close-up perspective view of an example reel cable support 210. The cable support 210 includes two opposing, generally rectangular and planar top and bottom flanges 220. Each flange 220 includes an inner surface 222, an outer surface 224, sides 226 and ends 228. Flanges 220 have a width WF, a height HF and a length LF. An example flange width WF=1.125", an example flange height HF=5" and an example flange length LF=18". In an example embodiment, flanges 220 are made from corrugated plastic, which is light-weight, flexible, and generally does not produce dust or particles when handled or subjected to chafing.

The flanges 220 are connected at their respective centers by an elongate (e.g., generally rectangular or oval) central hub 230 that extends in the long (axial) direction of the flanges. The hub 230 has an outer surface 232 and has a width WH, a height HH and a length LH. An example width WH=0.75", an example height HH=2" and an example length LH=15". An example generally rectangular hub 230 has four rounded corners 234 each with a radius of curvature RC suitable for not exceeding the bend limit of the cable 106. An example radius of curvature for rounded corners 234 is RC=1.7". In an example, the hub 230 is made from a lightweight material such as polypropylene, polystyrene, extruded polystyrene foam (i.e., STYROFOAM), polyethylene, engineering plastics, and combinations thereof. Such material is useful for protecting cable 106 when it is coiled around hub 230.

With continuing reference to FIGS. 9A and 9B and to FIG. 10, cable package 206 has a width WR, a height HR and a length LR. An example cable package width WR=1.175", an example cable package height HR=5", and an example cable package length LR=18". In an example, at least one cable package dimension is defined by at least one the cable support dimension, e.g., in the case where cable 106 does not extend beyond the confines of the cable support that corresponds to the at least one dimension. Thus, in one example, at least one of the cable package height HR, width WR and length LR is at least one of the cable support height, width and length.

In an example, ITM 100 has a width WM, a height HM and a length LM. An example ITM width WM=5", an example ITM height HM=1.5" and example ITM length LM=8.75". In an example embodiment, WR≦WM and HR≦HM. In another example, the cable package height HR is substantially the same as module height HM, i.e., the cable package height can be slightly bigger than the module height, as long as the cable package can fit into the interconnection apparatus.

With reference again to FIG. 10, the hub inner surface 232 and the opposing flange inner surfaces 222 define an open storage area 240 where the cable 106 is stored when coiled around the hub 230, as shown in FIG. 9A and FIG. 9B. In an example, the cable support 210 includes a guiding aperture (notch) 250 formed in one of the flanges 220, with the notch sized to loosely hold and guide cable 106 as the cable transitions from the ITM 100 to the cable support 210. Notch 250 also serves to prevent a transition portion 106T of the cable 106 from being pinched between the ITM 100 and cable support 210. The transition portion 106T may be, for example, an inch to several inches in length. Note that in an example, the transition portion 106T passes through the transition boot 124.

With reference once again to FIG. 10, an example of the cable support 210 includes a central hole 260 and two smaller peripheral holes 262 on either side of the central hole along the cable support longitudinal axis A2. These holes can be used to facilitate coiling and uncoiling the cable 106 onto and from the cable support 210. In an example, a coiling fixture (not shown) having three prongs that engage holes 260 and 262 is used to mechanically coil and uncoil the cable 106 into or from the cable support 210. In another example, one of the peripheral holes 262 is used to accommodate a strap 263 (see FIG. 16A) to better secure the cable support 210 to the ITM 100 after the cable is supported by (e.g., coiled onto) the cable support, rather than simply relying on cable 106 to join the ITM and the cable support. In yet another example, service personnel can take a rod, screwdriver or like implement and pass it through one of the holes 260 and 262 to facilitate uncoiling the cable 106.

Figure 11:
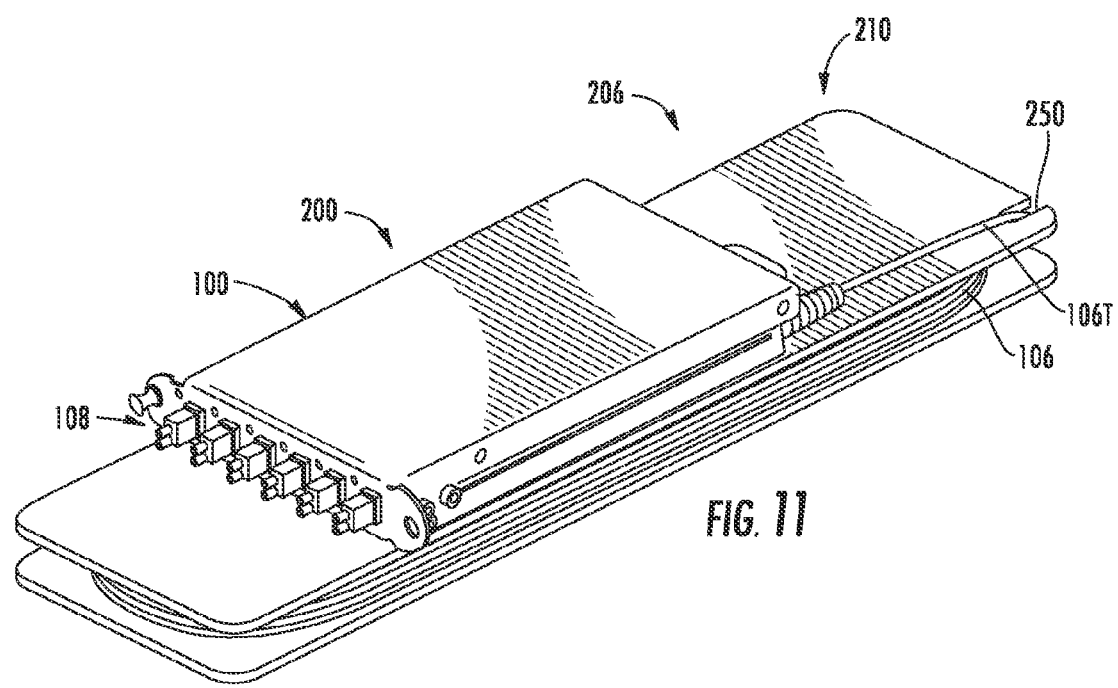
FIG. 11 is a perspective view and FIG. 12 and FIG. 13 are respective side-on and end-on views of an example ITM system, wherein the ITM and the cable support are arranged in a stacked configuration.
Figure 12:
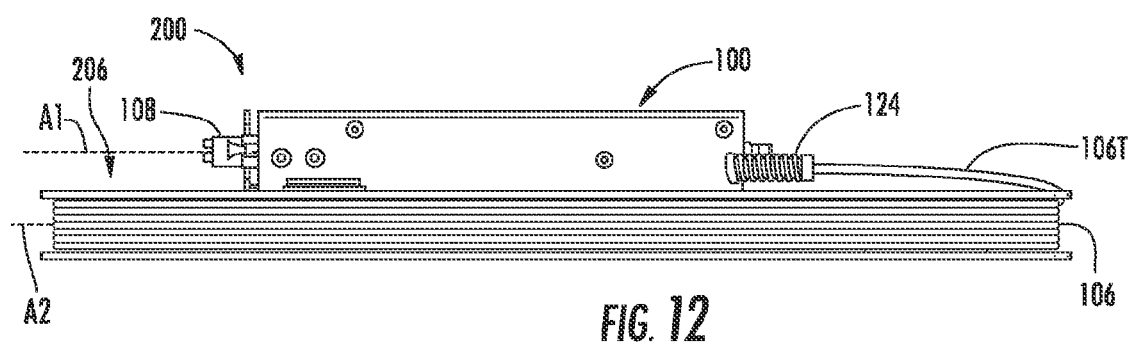
Figure 13:
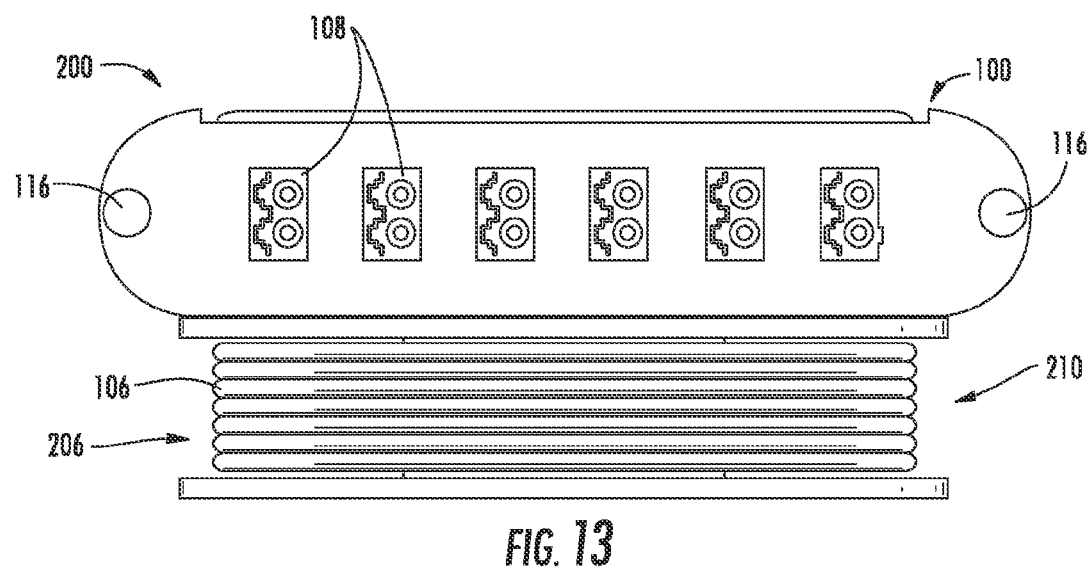

FIG. 11 is a perspective view and FIG. 12 and FIG. 13 are respective side-on and end-on views of an example ITM system 200, wherein the ITM 100 and the cable package 206 are arranged in a stacked configuration with their respective longitudinal axes A1 and A2 now generally parallel to one another (FIG. 12). In an example, this stacked configuration of the ITM system 200 is maintained using, for example, simple fixing means such as VELCRO™, an adhesive strap (not shown), strapping tape, etc. The stacked configuration of ITM the system 200 is useful for transporting the ITM system in anticipation of future deployment.

Figure 14:
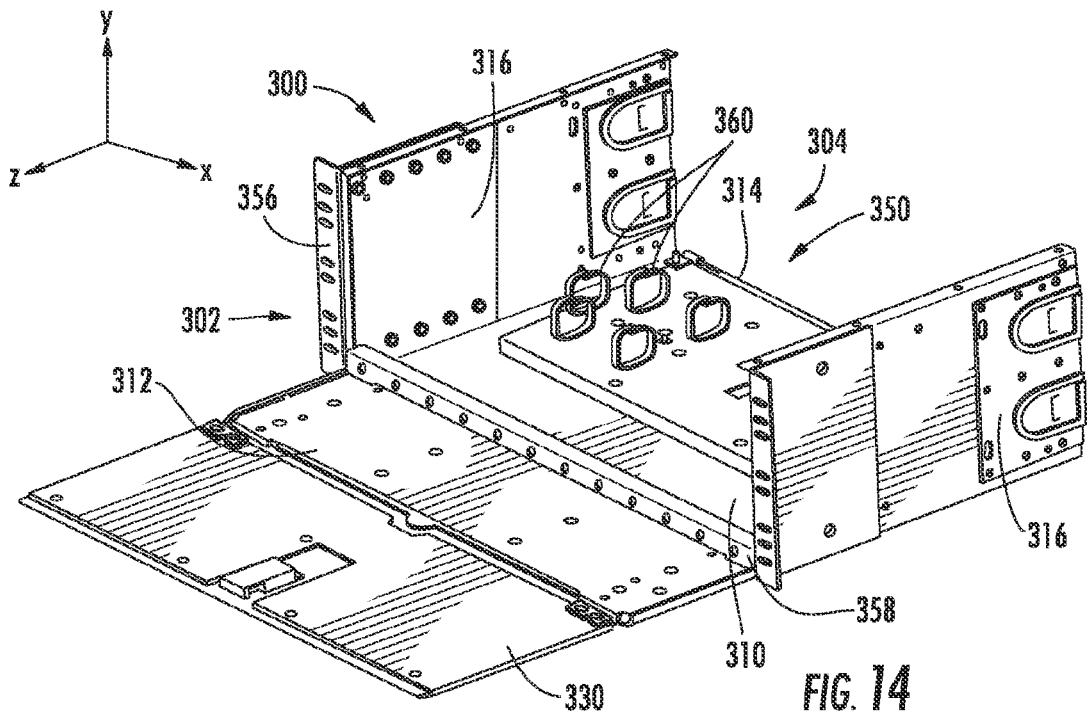
FIG. 14 and FIG. 15 are perspective views of an example interconnection apparatus configured to support multiple ITMs.
Figure 15:
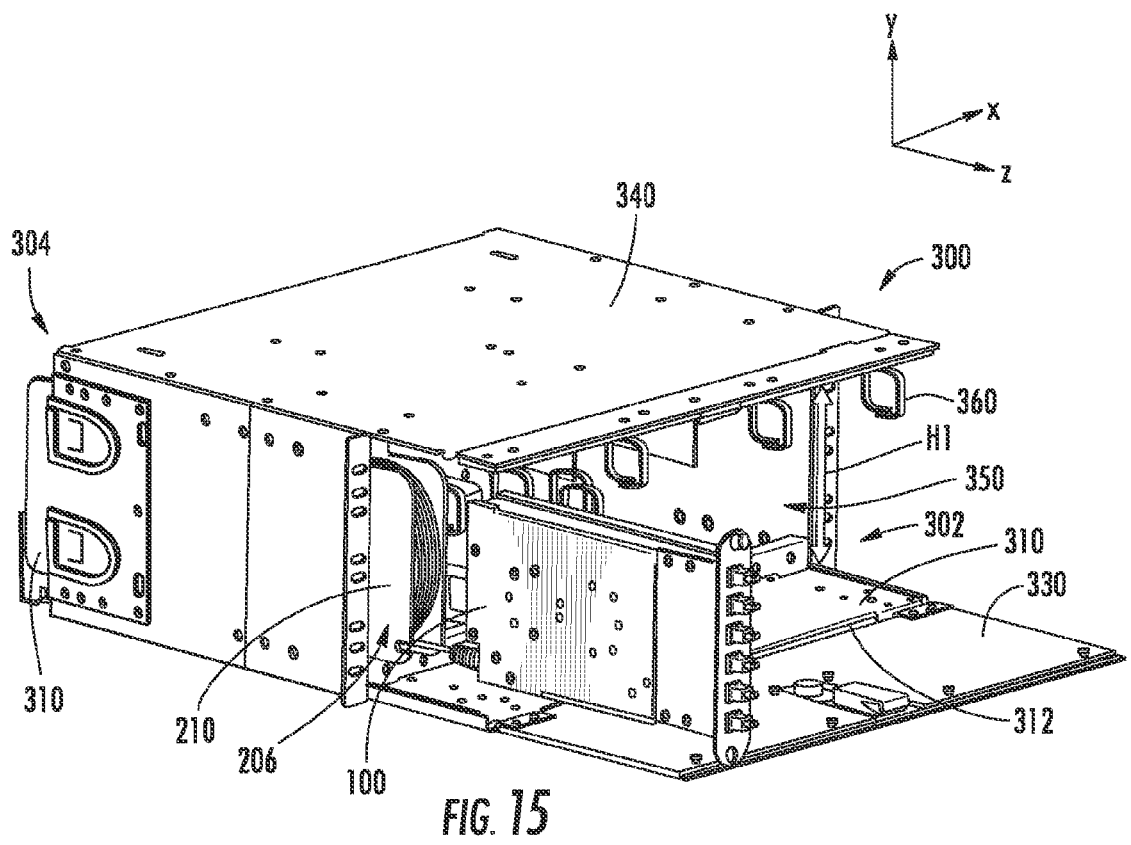

FIG. 14 and FIG. 15 are perspective views of an example interconnection apparatus 300 shown in the form of a connector housing. Interconnection apparatus 300 is configured to support multiple ITMs 100. Cartesian coordinates are shown in FIGS. 14 and 15 for the sake of reference. The interconnection apparatus 300 has a front end 302, a rear end 304, and includes a bottom panel 310 with front and rear edges 312 and 314. The interconnection apparatus 300 also includes opposing side panels 316, a folding front panel 330 connected to the bottom panel front edge 312, and a folding rear panel 334 attached to the bottom panel rear edge 314. The interconnection apparatus 300 also includes a top panel 340 attached to side panels 316. The side panels 316 and top and bottom panels 340 and 310 define a rectangular interior 350 of height H1. Bottom panel 310 and top panel 340 include guides 360 used to guide and support ITMs 100 as they are inserted into interconnection apparatus interior 350. Folding front panel 330 folds upward to close off interior 350 at front end 302, and folding rear panel 334 folds upward to close off interior 350 at rear end 304. A mounting frame 356 runs around the bottom panel front edge and the front sidewall panel edges and includes securing features 358 (e.g., holes) for securing (mounting) the ITMs 100 to the interconnection apparatus, as well as for securing the interconnection apparatus to a larger apparatus, such as distribution panel or frame (not shown).

In an example, the ITM width WM and the ITM height HM are sized so that the ITM 100 can slide into the interconnection apparatus 300 at front end 352 oriented as shown in FIG. 15, (i.e., with the ITM 100 oriented with its height HM along the Y-direction) and reside in interior 350. Thus, in order for ITM system 200 be accommodated in interconnection apparatus 300 in an operable manner, the cable package height HR has to be less than the interconnection apparatus interior height (i.e., HR<H1). Further, in order to accommodate adjacent ITMs in interior 350, the cable package width WR has to be equal to or less than the module width (i.e., WR≦WM). In an example, the cable package height HR is equal to or less than the module height HM (i.e., HR≦HM). In an example as discussed above, at least one of the cable package dimensions is defined by at least one cable support dimension.

Figure 16A:
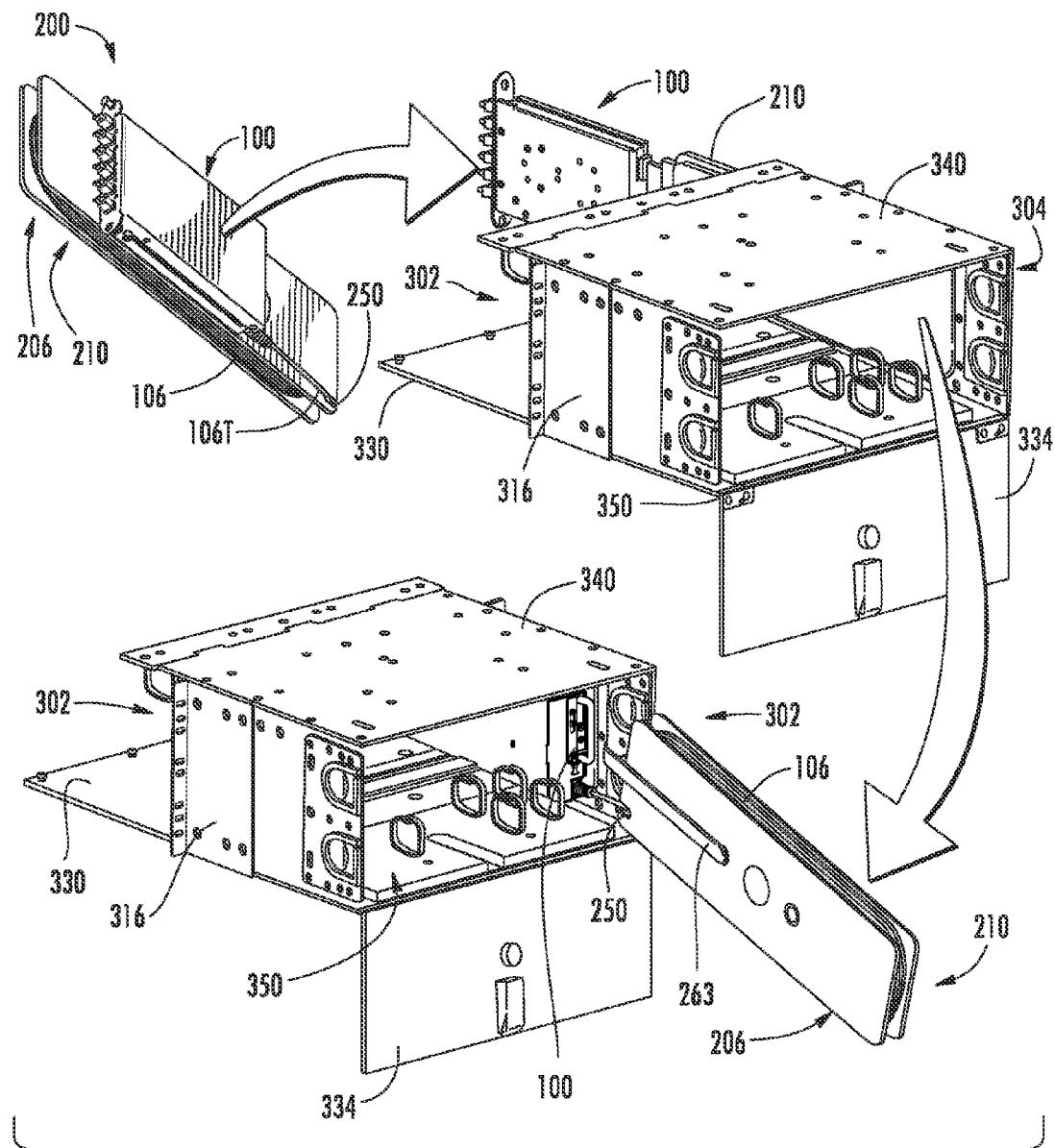
FIG. 16A is a perspective view of an example interconnection apparatus and the ITM system, illustrating an example method of installing the ITM system in the interconnection apparatus so that the cable support extends from the housing rear in preparation for deploying the fiber optic cable from the cable support.
Figure 17:
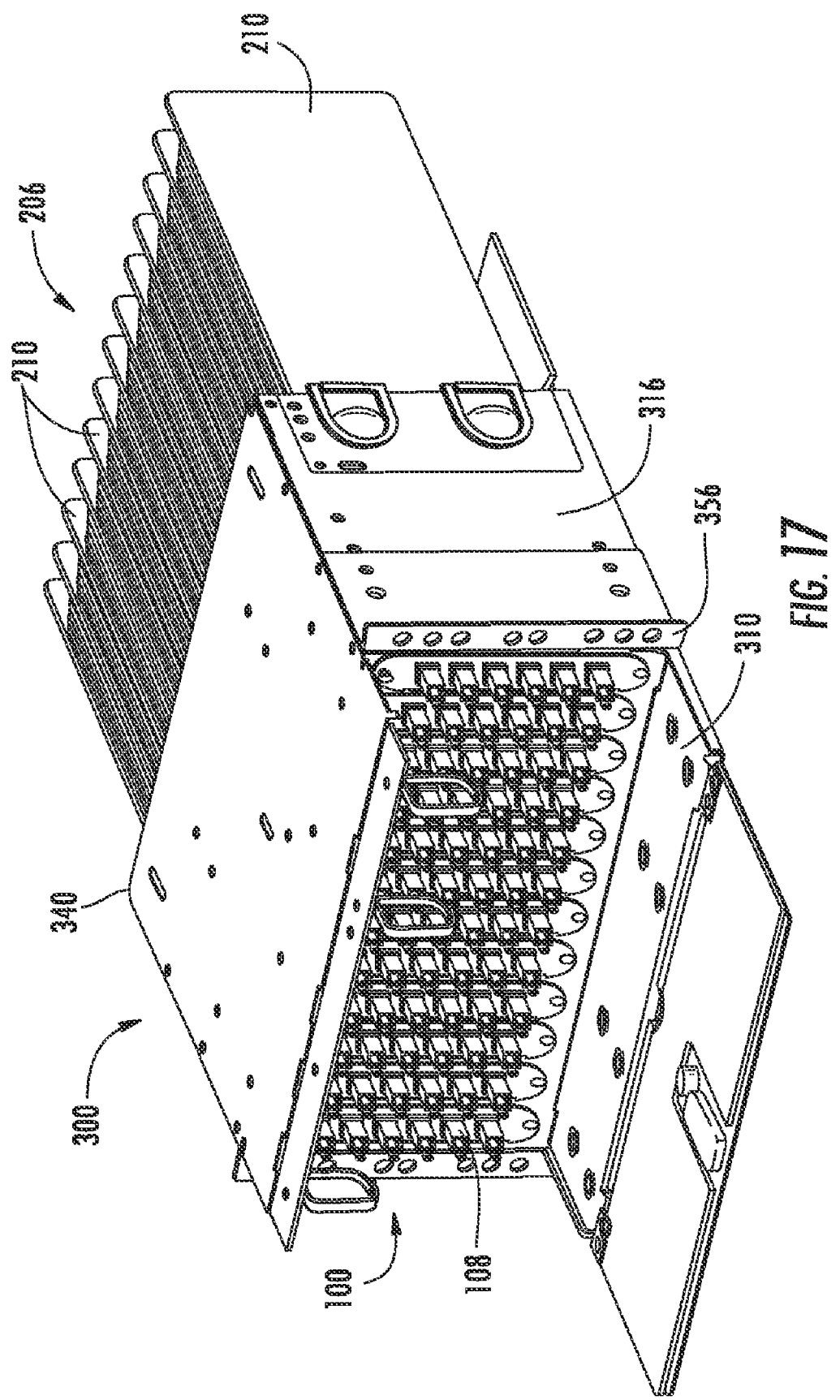

Thus, with continuing reference to FIGS. 14 and 15 and also to FIG. 16A, a method of deploying cable 106 in cable network includes providing the ITM system 200 in a stacked configuration (FIGS. 11-13) and delivering it to interconnection apparatus 300. Cable package 206 and ITM 100 are then taken out of the stacked configuration and placed in the in-line configuration (FIGS. 8A-9B). In the case where the interconnection apparatus 300 includes a front panel that has slots (not shown) that need to be uncovered for inserting ITMs 100, the slot covers are removed. Cable package 206 is then feed into interconnection apparatus interior 350 at front end 302 (through the aforementioned slots, if necessary) with its height HR along the Y-direction. Cable package 206 is then passed through the interconnection apparatus interior 350 (see also FIG. 15) and out of the interconnection apparatus rear end 304. This allows for ITM 100 to then be placed in interconnection apparatus interior 350 and secured to interconnection apparatus 300 at front end 302. This process is repeated for other ITM systems 200 until interconnection apparatus is filled with ITM systems 200, as illustrated in the perspective and top-down views of FIG. 17 and FIG. 18.

Figure 16B:
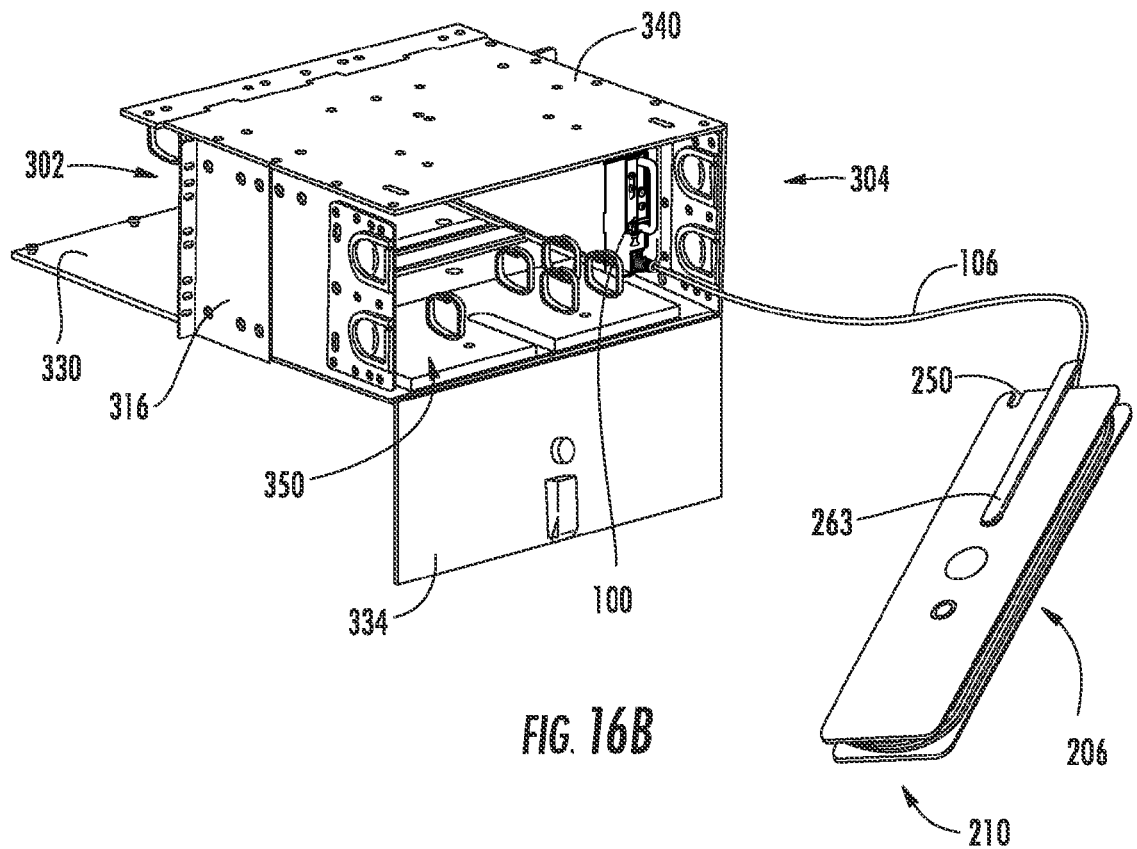
FIG. 16B is a close-up rear view of the interconnection apparatus and the ITM system installed therein, illustrating the uncoiling of the fiber optic cable from the cable support in the process of deploying the fiber optic cable.
Figure 16C:
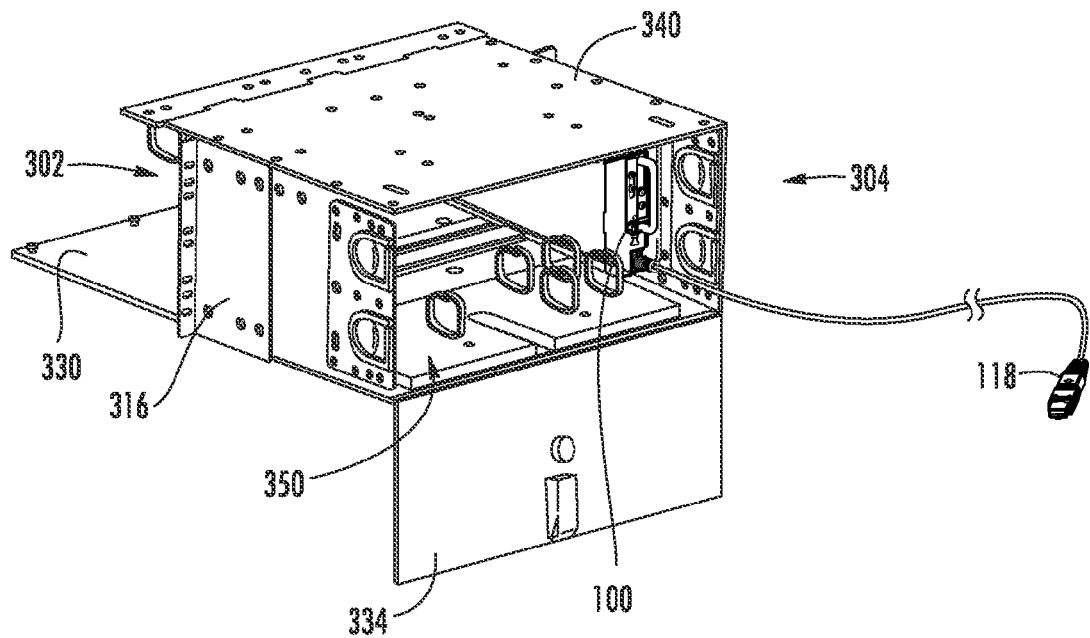
FIG. 16C is similar to FIG. 16B, and shows the fiber optic cable uncoiled and the multifiber connector ready to be connected to a predetermined location.

With reference to FIG. 16B and FIG. 16C, upon installing each ITM system 200, the cable 106 may then be deployed by uncoiling the cable, e.g., from cable support 210 (FIG. 16B) and routing the multi-fiber connector 118 to its predetermined destination (FIG. 16C). At this point, if a cable support 210 is used in cable package 206, the able support can be discarded or recycled for use in forming another ITM system 200.

Thus, a method of installing a cable 106 in interconnection apparatus 300 includes providing a connector package 100 having at least one connector adapter 108, the connector package configured to support a portion of a connectorized cable 106, with one cable end connected to the at least one connector adapter and another cable end connected to a connector. The method also includes providing at least one cable package 206, the cable package including at least one length of the cable 106, and the cable package storing a portion of the cable on substantially the exterior of the connector package. The cable package 206 is sized to pass through the interconnection apparatus interior 305 from the front opening 352 to the rear opening 354 as the connector package is inserted in the interconnection apparatus.

Although the embodiments herein have been described with reference to particular features, it is to be understood that these embodiments are merely illustrative of the principles and applications thereof. It is therefore to be understood that numerous modifications may be made to the illustrative embodiments and that other arrangements may be devised without departing from the scope of the appended claims.

What is claimed is:

1. A cable network interconnection system for installation in an interconnection apparatus, the interconnection apparatus having a front opening and a rear opening, the system comprising:
  a connector package, the connector package having at least one connector adapter and configured to operably support a portion of a connectorized cable connected at a cable end to the at least one connector adapter, with another cable end connected to a connector; and at least one cable package, the cable package including a cable support with at least one flange and at least one length of cable, the cable package storing a portion of the cable on substantially the exterior of the connector package, and the cable package is sized to pass through the interconnection apparatus interior from the front opening to the rear opening as the connector package is inserted in the interconnection apparatus, wherein the at least one flange at least partially includes corrugated material.

2. The system of claim 1, wherein the connector package comprises a module having a housing that defines an interior cavity, and wherein the portion of the connectorized cable supported by the connector package is contained within the interior cavity.

3. The system of claim 1, wherein the interconnection apparatus is an optical interconnection apparatus.

4. The system of claim 1, wherein the cable package comprises at least one cable support, and the cable package has a height HM, the at least one cable support has a height HR, and HR≦HM.

5. The system of claim 4, wherein the connector package has a width WM, the cable support has a width WR, and wherein WR≦WM.

6. The system of claim 1, wherein the at least one flange includes at least one guiding aperture sized to loosely guide the at least one length of cable.

7. The system of claim 2, the module comprising a connector boot attached to the housing and through which the cable passes as the cable transitions between the module and the cable package.

8. The system of claim 4, wherein the at least one cable support includes at least one generally centrally located aperture and at least two peripherally located apertures to facilitate movement of the cable onto and from the cable support.

9. The system of claim 4, wherein the at least one cable support is at least partially made of a material selected from the group of materials consisting of polypropylene, polystyrene, polyethylene, engineering plastic, and combinations thereof.

10. The system of claim 1, wherein the cable package comprises at least one cable support configured to store up to 200 feet of cable.

11. The system of claim 10, wherein the cable includes at least one optical fiber.

12. The system of claim 11, wherein the cable includes at least one copper conductor.

13. The system of claim 10, wherein the cable includes at least one optical fiber and at least one copper conductor.

14. The system of claim 4, wherein the interconnection apparatus has a front opening height H1, the at least one cable support has a height HR, and wherein HR≦H1.

15. The system of claim 1, wherein the at least one cable of the cable package is pre-connectorized.

16. A method of installing a cable in an interconnection apparatus with an interior having a front opening and a rear opening, comprising:
providing a connector package configured as a module having a housing that defines an interior cavity and having at least one connector adapter, the connector package configured to support a portion of a connectorized cable within the interior cavity, with one cable end connected to the at least one connector adapter and another cable end connected to a connector; and
providing at least one cable package, the cable package including a cable support having at least one flange that at least partially includes corrugated material and at least one length of cable, and the cable package storing a portion of the cable on substantially the exterior of the connector package, and the cable package is sized to pass through the interconnection apparatus interior from the front opening to the rear opening as the connector package is inserted in the interconnection apparatus.

17. The method according to claim 16, wherein the interconnection apparatus is an optical interconnection apparatus.

18. The method according to claim 16, wherein the cable package comprises at least one cable support, and the connector package has a height HM, the at least one cable support has a height HR, and HR≦HM.

19. The method according to claim 18, wherein the connector package has a width WM, the at least one cable support has a width WR and wherein WR≦WM.

20. The method according to claim 16, further comprising providing the at least one flange with at least one guiding aperture sized to loosely guide the at least one length of cable.

21. The method according to claim 16, further comprising providing the module with a connector boot attached to the housing, and passing the cable through the connector boot as the cable transitions between the module and the cable package.

22. The method according to claim 18, further comprising providing the at least one cable support with at least one generally centrally located aperture and at least two peripherally located apertures to facilitate movement of the cable onto and from the cable support.

23. The method according to claim 18, further comprising forming the at least one cable support at least partially from a material selected from the group of materials consisting of polypropylene, polystyrene, polyethylene, engineering plastic and combinations thereof.

24. The method according to claim 16, further comprising providing the cable package with at least one cable support being configured to store up to 200 feet of cable.

25. The method according to claim 24, wherein the cable includes at least one optical fiber.

26. The method according to claim 24, wherein the cable includes at least one copper conductor.

27. The method according to claim 24, wherein the cable includes at least one optical fiber and at least one copper conductor.

28. The method according to claim 18, wherein the interconnection apparatus has a front opening of height H1, and further comprising configuring the cable support to have a height HR, with HR≦H1.

29. The method according to claim 16, further comprising pre-connectorizing the at least one cable.

30. A pre-connectorized cable product for deployment in an optical interconnection apparatus having an interior with front and rear ends, formed by the process comprising:
providing a generally rectangular module having a housing and at least one connector adapter, the housing defining an interior cavity that contains a portion of a pre-connectorized cable, with an end of the cable portion connected to the at least one connector adapter and another cable end connected to a multi-fiber connector, and the module has a width WM and a height HM;
providing a reel sized to pass through the optical interconnection apparatus interior from the front opening to the rear opening, and the reel has a width WR and a height HR, wherein WR≦WM and HR≦HM; and
storing the cable portion on the reel in a coiled manner.

* * * * *